United States Patent

[11] 3,618,973

| [72] | Inventor | Jean Panhard<br>Paris, France |
|---|---|---|
| [21] | Appl. No. | 875,713 |
| [22] | Filed | Nov. 12, 1969 |
| [45] | Patented | Nov. 9, 1971 |
| [73] | Assignee | Societe De Constructions Mechaniques<br>Panhard & Levassor<br>Paris, France |
| [32] | Priorities | Nov. 13, 1968 |
| [33] | | France |
| [31] | | 173596;<br>Sept. 17, 1969, France, No. 6931666 |

[54] HYDROPNEUMATIC VEHICLE-WHEEL SUSPENSION SYSTEM
16 Claims, 7 Drawing Figs.

[52] U.S. Cl. ........................................ 280/124 F, 267/64 A
[51] Int. Cl. .................................................. B60g 17/04
[50] Field of Search ............................................. 267/15 A, 64 A, 64 B, 65 D; 280/6.1, 124 R, 124 F

[56] References Cited
UNITED STATES PATENTS

| 2,792,235 | 5/1957 | Federspiel ..................... | 280/124 F |
| 2,885,202 | 5/1959 | Trumper ....................... | 280/124 F X |
| 3,227,466 | 1/1966 | Garcea et al.................. | 280/124 F X |

*Primary Examiner*—Duane A. Reger
*Attorney*—Waters, Roditi, Schwartz & Nissen

ABSTRACT: A hydropneumatic suspension comprises a suspension arm which bears the wheel and which is hinged on an axle fixed on the chassis of the vehicle. The piston which slides in the cylinder and which is adapted to displace liquid contained in a chamber connected to two oleopneumatic accumulators is pivoted on the arm. A device for replenishing liquid to the chamber is arranged so that for a given load on the wheel a certain position of the wheel with respect to the chassis is maintained despite possible leakages.

HYDROPNEUMATIC VEHICLE-WHEEL SUSPENSION SYSTEM

This invention relates to hydropneumatic suspensions for vehicles of the kind comprising, on the one hand, connecting means adapted to permit a substantially vertical movement of at least one wheel with respect to the vehicle frame or body, on the other hand, a piston the displacement of which in a cylinder is linked to the vertical movement of said wheel, which piston is adapted, under the action of the load transmitted to the wheel, to force liquid contained in a chamber of the cylinder towards at least one oleopneumatic accumulator, and, furthermore, a source of liquid under pressure and a distributor comprising a control slide valve, which distributor is adapted to connect the cylinder alternately to the source or to an outlet.

The invention relates more particularly, but not exclusively, from among these suspensions, to those for heavy motor vehicles, because it is in this case that the application thereof seems bound to offer most interest.

It has the aim, above all, of making said suspensions such that they meet the various requirements in practice better than heretofore and, in particular, such that they make it possible to produce the correspondence to a given load per wheel of a specific position of the wheel with respect to the frame.

A hydropneumatic suspension of the kind in question is characterized by the fact that its control slide valve is subjected to two opposing forces, on the one hand a first force exerted by at least one spring or system of springs the elongation of which is proportional to the displacement of the piston and, on the other hand, a second force proportional to the pressure of the liquid contained in the chamber of the cylinder, the characteristics of the system of springs being determined in such manner that, for at least a part of the stroke of the piston, the first force is substantially equal, at each point of this part of the stroke of the piston, to the opposing force which would be developed on the slide valve by the pressure of the compressed gas of the accumulator if no escape of said liquid occurred, the assembly being such that the distributor admits supplementary liquid into the cylinder when the second force becomes lower than the first, as a result of which the volume of liquid contained in the cylinder and the accumulator is maintained substantially equal to a predetermined constant value, at the very least for slow evolutions of the suspension corresponding to a static characteristic and for a given temperature of the gas in the accumulators.

Apart from this main arrangement, the invention consists of certain other arrangements which are preferably used at the same time and which will be discussed more explicitly hereinafter.

The invention can in any case be clearly understood with the aid of the following additional description and of the accompanying drawings, which additional description and drawings relate to preferred constructional forms.

First of all, as regards the suspension as a whole, this is arranged in the following manner.

A suspension arm (FIG. 1) articulated at one of its ends to a spindle 2 carried by the body or frame 3 of the vehicle supports at least one wheel 4 at its other end. This arm 1 is fast in rotation with a rigid member 5 articulated at one of its ends to the spindle 2, located above said spindle and the other end of which bears a spindle 6 parallel to the spindle 2 and on which there swivels a bearing 7.

Figure 1:
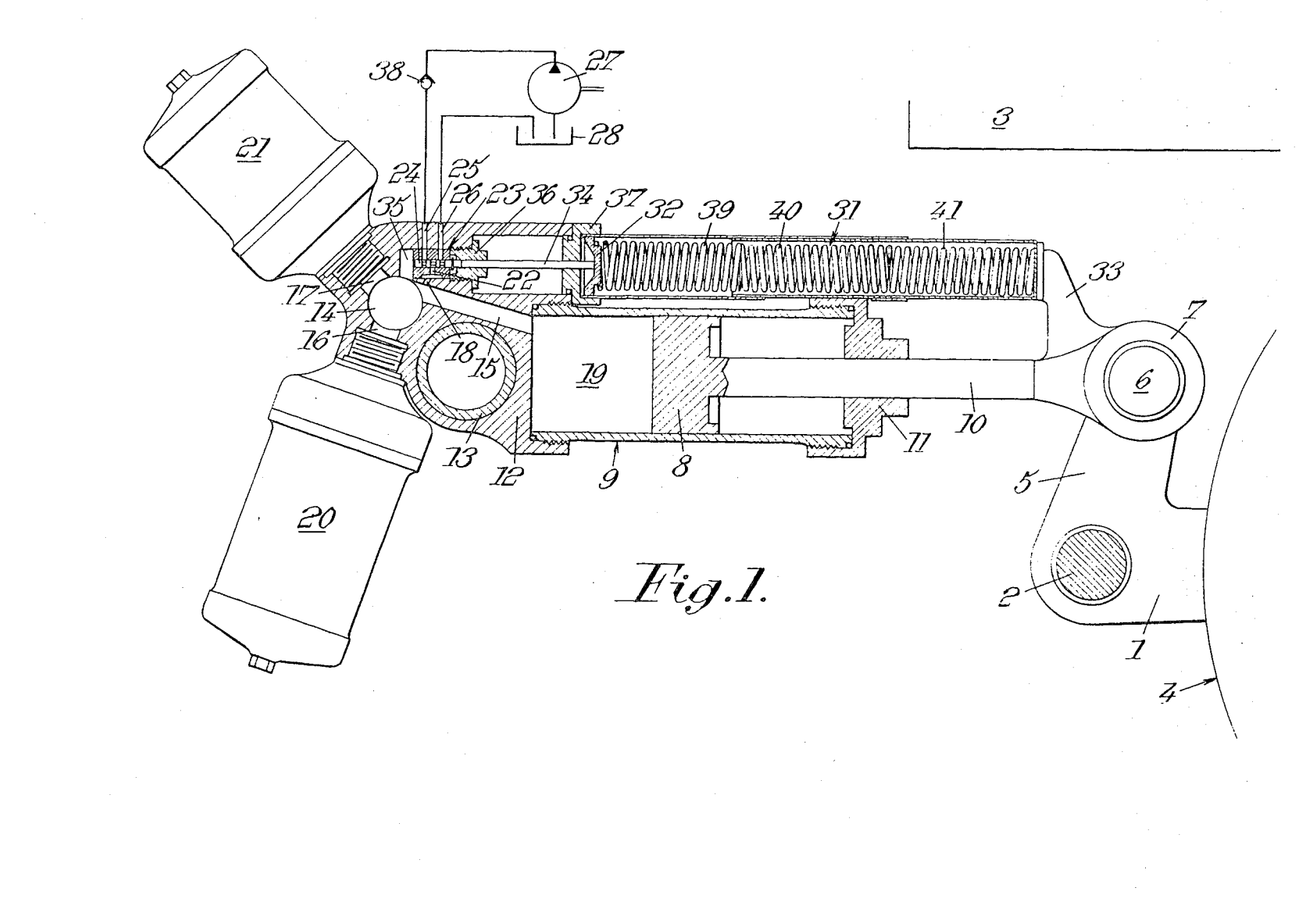
FIG. 1 of these drawings shows in diagrammatic section a hydropneumatic suspension constructed in accordance with the invention.

A piston 8 sliding in a cylinder 9 is rendered fast with the bearing 7 by a rigid rod 10 substantially perpendicular to the middle line of the member 5.

The cylinder 9 is closed at one of its ends by a threaded plug 11 through which the rod 10 extends, said cylinder 9 being screwed at its other end into a cylinder head 12 articulated to a spindle 13 parallel to the spindle 2 and carried by the frame 3.

The cylinder head 12, the form of which is shown in FIG. 1, has an internal cavity 14 into which there opens a plurality of ducts 15, 16, 17 and 18. The duct 15 connects the cavity 14 to a chamber 19 inside the cylinder 9 and located, with respect to the piston 8, on the side opposite that where the rod 10 is located. The ducts 16 and 17 connect the cavity 14 to two oleopneumatic accumulators 20 and 21, respectively, which are screwed into the cylinder head 12. Finally, the duct 18 establishes communication between the cavity 14 and a passage 22 of a hydraulic distributor 23 (see FIGS. 3 and 4) mounted in said cylinder head, which distributor comprises a distributor valve 24, which is preferably sliding and has its axis parallel to that of the cylinder 9, and two further passages 25 and 26 respectively connected to a source of liquid under pressure 27 and to an outlet or reservoir 28. The slide valve 24 serves, by means of its displacement, either to connect the passage 22 and the passage 25 together and thus feed the chamber 19 with liquid, or to connect the passage 22 and the passage 26 together and thus connect said chamber 19 to the outlet, or to isolate these passages from one another. Means comprising a ring 24a (FIGS. 3 and 4) are provided for limiting the amplitude of the stroke of the slide valve 24.

The oleopneumatic accumulators 20, 21, which are of a conventional piston, bladder or diaphragm type, are calibrated at different pressures so that the accumulator 21, for example, is always in action and the accumulator 20 comes into action only from a certain pressure $P_L$. It would be possible, if necessary, to provide more than two accumulators calibrated so as to come into action in succession. The hydraulic liquid fills the chamber 19, the ducts 15, 16, 17, 18, the cavity 14 and part of the accumulators 20, 21; the other part of these accumulators, of course, contains a gas such as nitrogen.

A suspension of this kind operates in the following manner.

The load supported by the wheel 4 generates a ground reaction which tends to cause the member 5 to turn anticlockwise (in relation to FIG. 1) and displace the piston 8 in a sense such that liquid is forced from the chamber 19 towards the accumulators 20 and 21 so as to compress the gas in these accumulators. Equilibrium is established when the force exerted on the piston 8 by the liquid is equal in absolute value to that exerted by the rod 10. To a load supported by the wheel 4 there corresponds a given stress transmitted by the rod 10 to the piston 8 and to this stress there corresponds a well-defined pressure of the liquid when the piston 8 is in equilibrium.

Since the liquids transmit the pressures, the liquid in the chamber 19 is at the same pressure as that in the accumulators 20 and 21. The pressure of the liquid is therefore equal to that of the gas in the accumulator or accumulators which is or are in action.

The mass of gas being constant and the temperature of the gas (which can be assumed to be constant as a first approximation) being known, there corresponds to a given pressure a well-defined volume of gas and, conversely:

The volume of gas being perfectly determined by the pressure, and therefore by the load supported by the wheel 4, the position of the piston 8 is perfectly determined when the volume of liquid, assumed to be incompressible, contained in the chamber 19 and the accumulators 20 and 21 is known. More particularly, if this volume of liquid is constant, to a given load on the wheel 4 there will always correspond the same position of the piston 8. It will therefore be possible to plot a curve 29, or static characteristic, representing the forces exerted on the piston 8 by the liquid under pressure, expressed, for example, in newtons, as a function of the movements of the piston, expressed, for example, in millimeters (solid-line curve in FIG. 2). The angular point 30 of this curve is due to the coming into action of the second accumulator 20 for a pressure $P_L$ to which there corresponds a force $Y_L$. The static characteristics remain valid for slow evolutions of the suspension.

If, however, by reason of leakages, the volume of liquid imprisoned between the gas of the accumulators and the piston 8 is not constant, to a given load on the wheel 4 there will not always correspond the same position of the piston 8. The more the volume of liquid decreases, the more the piston 8 will be displaced towards the left of FIG. 1, but without the pressure and the volume of the gas compressed in the accumulators having changed for a given load.

As it is not possible to get completely rid of leakages of liquid in hydropneumatic suspensions, a device for resupplying liquid comprising, in particular, a distributor such as 23 and a source of pressure such as 27 has already been provided, but, in the known constructions, the control of the slide valve of the distributor is such that a given position of the wheel 4 with respect to the frame 3 does not correspond to a given load on said wheel.

According to the main arrangement of the invention, in order to obtain this condition, the distributor slide valve 24 is subjected to two opposing forces, on the one hand a first force $F_1$ (FIGS. 3 and 4) exerted by at least one spring or system of springs 31 (FIG. 1) the elongation of which is proportional to the displacement of the piston 8 and, on the other hand, a second force $F_2$ proportional to the pressure of the liquid contained in the cylinder 9, the characteristics of the system of springs 31 being determined in such manner that, for at least a part of the stroke of the piston 8, the first force $F_1$ is substantially equal, at each point of this part of the stroke, to the opposing force exerted by the compressed gas in the accumulator or accumulators if no escape or leakage of the liquid occured, the assembly being such that the distributor 23 admits supplementary liquid into the cylinder 9 when the second force $F_2$ becomes lower than the first force $F_1$, as a result of which the volume of liquid contained in the cylinder and the accumulator or accumulators is maintained substantially equal to a predetermined constant value for a given temperature of the gas in the accumulators.

The system of springs 31 is advantageously constituted by coil springs having axes parallel to that of the cylinder 9 and compressed between one face of a movable cup 32 and a rigid member 33 in the form of a pistol grip and connected to the bearing 7. In this way, the elongation of the system 31 is not only proportional but also equal to the displacement of the piston 8. The cup 32 bears at its other face against one end of a rod 34 coaxial with the slide valve 24, which receives from this rod, which bears against it, a thrust equal to the force $F_1$. This thrust tends to shift the slide valve towards the left of FIG. 1, towards a position in which liquid under pressure is admitted to the cylinder 9 from the source 27.

The distributor 23 is located in a seat 35 in the cylinder head 12 and the face of the slide valve 24 which is remote from that receiving the thrust $F_1$ is bathed by liquid coming from the cavity 14, with which the seat 35 communicates.

The force $F_2$ developed by the liquid at the pressure of the chamber 19 on the slide valve 24 is of opposite sense to the force $F_1$ and tends to displace the slide valve towards the right of FIG. 1, towards a position in which the liquid in the chamber 19 escapes to the reservoir 28.

Members 36 and 37 in the form of cylindrical plugs are advantageously provided, these being connected to the cylinder head 12 and each having a bore serving to guide the rod 34.

The plug 36 limits the movement of the ring 24a to the right. The plug 37 has a second bore serving as a guide for the cup 32.

A nonreturn valve 38 is preferably arranged in the pipe connecting the source 27 to the distributor 23, so that the liquid can flow from the source towards the distributor, but not in the opposite direction.

The characteristics of the system of springs 31 are determined in the following manner.

Figure 2:
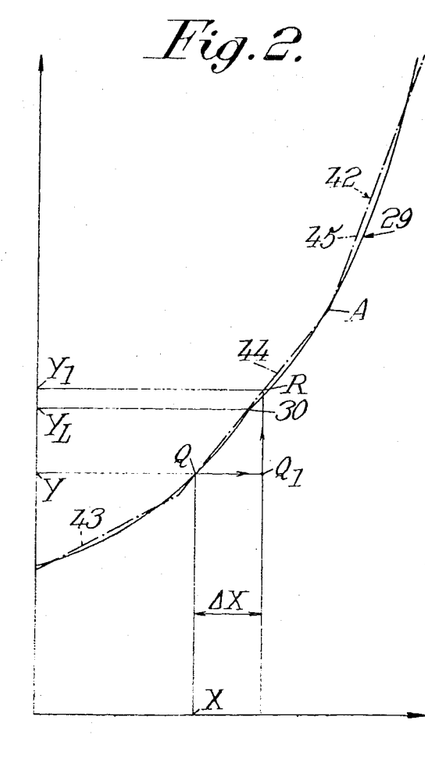
FIG. 2 shows curves illustrating the operation of said suspension.

The curve 29 in FIG. 2 represents, as already explained, a hydropneumatic-suspension law for a constant given volume of liquid contained in the chamber 19 and the accumulators 20 and 21. Let S be the section of the piston 8 and $s$ the section of the slide valve 24, to which sections the liquid under pressure is admitted. The system of springs 31 is determined in such manner that the force $F_1$ is substantially equal, for a displacement X of the piston 8, to the ordinate Y of the point Q of the curve 29 (FIG. 2) having the abscissa X, multiplied by the ratio $s/S$, that is:

$$F_1 = Y \, s/S.$$

It can be seen immediately that the curve representing the variations of $F_1$ as a function of X may be identical with the curve 29 if, the scale of the abscissae remaining unchanged, the scale of the ordinates is expanded in the ratio $S/s$. In other words:

for a curve 29 relating to the suspension proper, to a force of 1 Newton there corresponds, on the Y-axis a length of $b$ millimeters;

for the curve relating to the system of springs 31 which is identical with the curve 29, to a force of 1 Newton there corresponds, on the Y-axis a length of $b \cdot S/s$ millimeters.

Instead of installing a single spring of variable flexibility, which is difficult and costly to make, the system of springs 31 is advantageously produced with the aid of several, and in particular three, coil springs 39, 40, 41 of different, but constant, respective flexibilities and disposed in series between the member 33 in the form of a pistol grip and the cup 32.

It is recalled that a spring of length L and of constant stiffness $k$, subjected to a stress F, an elongation $\Delta L$ such that
$F = K \cdot \Delta L$   (1)ps and and that the flexibility $f$ of the spring is defined by the formula:
$$f = l/k.$$

In order to determine the flexibilities of the springs 39, 40, 41, a line with breaks 42 (chain-dotted curve in FIG. 2), composed of three straight line segments 43, 44, 45 of different slopes and approaching the curve 29 as closely as possible, is drawn and the line 42 is compared to the curve 29. The approximation could be improved by using more than three springs.

Each straight line segment 43, 44, 45 represents graphically the formula (1) and corresponds to a spring of constant flexibility. It is moreover known that the flexibilities of springs disposed in series are added to one another. The minimum value of the flexibility of three springs disposed in series is therefore equal to that of the least flexible spring, that is to say the stiffest spring, and is obtained when the other two springs are turn against turn or in abutment against a stroke limiter.

The segment 45, which has the most pronounced slope, therefore determines the minimum flexibility of the system 31, that is to say that of the stiffest spring, the spring 39 for example. The system 31 is arranged in such manner that, for movements of the piston 8 of which the amplitudes exceed the abscissa of the point A (FIG. 2) common to the segments 44 and 45, the springs 40 and 41 are turn against turn or in abutment against a stroke limiter (not shown).

The intermediate segment 44, which has a medium slope, corresponds to the medium flexibility of the system, which is obtained when the springs 39 and 40 are in action, the spring 41 being always turn against turn. The flexibility of the spring 39 being known, that of the spring 40 is equal to the flexibility of the springs 39 and 40 in series, less the flexibility of the spring 39.

Finally, the segment 43, which has a small slope, determines the greatest flexibility of the system 31, which is obtained when the three springs 39, 40 and 41 are operating freely. The flexibility of the spring 41 is equal to that of the whole assembly, less those of the springs 39 and 40.

This being the case, a suspension of this kind operates in the following manner.

If no leakage of liquid occurs, the volume of liquid imprisoned between the piston 8 and the gas in the accumulators 20 and 21 remains constant and the suspension follows the law represented by the curve 29. The point Q on the curve 29 corresponds to a displacement X of the piston 8. The ordinate Y eof the point Q represents the force exerted by the rod 10 on the piston 8. The pressure P of the liquid when the piston 8 is in equilibrium is is P=Y/S and the force $F_2$=P·s=Ys/S. As, by construction, $F_1$=Ys/S (except for the slight difference existing between the curves 29 and 42 of FIG. 1), $F_1$=$F_2$ and the slide valve 24, in equilibrium, places itself in a position in which this equilibrium is maintained, that is to say a position in which the passage 22 is isolated from the source 27 and from the outlet 28.

If the load borne by the wheel 4 remains constant, the force Y exerted by the rod 10 on the piston 8 remains constant and the pressure P of the liquid remains constant. When an escape of liquid of volume ΔV occurs, the piston 8 is displaced from the previous position of equilibrium towards the left of FIG. 1 by a value ΔX=ΔV/S. In FIG. 2, the point Q will move to the right, on a line parallel to the X-axis as far as the point $Q_1$ with the abscissa X=ΔX. The displacement ΔX of the piston 8 is accompanied by a supplementary compression of the system of springs 31. The slide valve 24 is subjected, on the one hand, to the unchanged force $F_2$=s/S and, on the other hand, to a higher force $F_1$. The force $F_1$ is equal to $Y_1$·s/S, $Y_1$ being the ordinate of the point R on the curve 42 with the abscissa X+ΔX. The slide valve 24 will move towards the left of FIG. 2 so as to admit a volume of liquid equal to ΔV At this moment, the forces $F_1$ and $F_2$ become equal again, not by reason of an increase in the pressure of the liquid imprisoned in the chamber 19 and the accumulators 20 and 21, but by reason of the displacement of the piston 8 by ΔX towards the right of FIG. 1, which causes $F_1$ to decrease to the value of Ys/S.

It is clear that if the volume of liquid were too considerably, the force $F_2$ would be greater than $F_1$ and the slide valve 24 would be shifted towards the right so as to connect the passage 22 to the outlet 28 until the equilibrium of the forces $F_1$, $F_2$ is reestablished and, therefore, until a given volume of liquid is reestablished in the accumulators and the cylinder.

In this way, a given position of said piston and, therefore, of the wheel 4 with respect to the frame 3 is assigned definitely to a force Y exerted on the piston 8.

Figure 5:
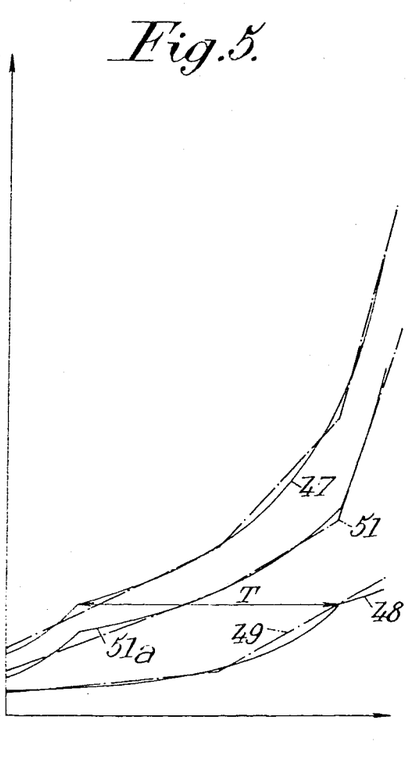
FIGS. 5 and 6 respectively illustrate the operation of the suspensions of FIGS. 3 and 4.

According to another constructional form of the invention (FIG. 3), there are provided two springs or systems of springs 31a and 31b for acting on the slide valve 24, and means 46, referred to herein as the "suspension selector," which, in a position referred to herein as the "cross-country position," enable both systems 31a and 31b to be allowed to act and a first law of suspension, represented by a curve 47 (a solid line in FIG. 5), to be obtained, and, in a position referred to herein as the "road position," enable one of the two systems of springs (the system 31b) to be put out of operation and a second law of suspension, represented by a curve 48 (a solid line in FIG. 5), to be obtained. The curves 47 and 48 in FIG. 5 represent, for the constructional form of FIG. 3, the variation of the forces exerted on the piston 8 by the liquid under pressure, expressed in newtons and given as ordinates, as a function of the movements of said piston, expressed in millimeters and given as abscissae.

Figure 3:
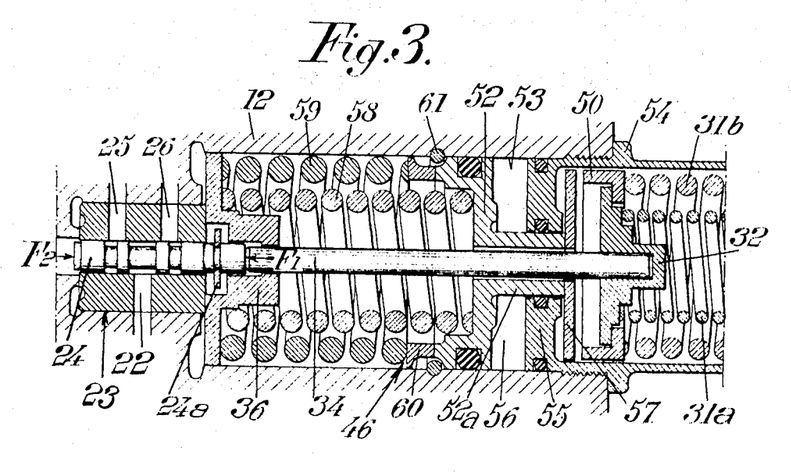
FIGS. 3 and 4 show in diagrammatic section variants of a part of the suspension of FIG. 1.

The elements in FIG. 3 which are identical to those in FIG. 1 are designated by the same references.

The two systems of springs 31a and 31b are preferably disposed in parallel and are composed of concentric coil springs. Like the system 31 of FIG. 1, the system of springs 31a acts directly on the cup 32. Bearing in mind the foregoing explanations and the flexibility curve 49 of the system of springs 31a plotted in FIG. 5, it can be seen that this system is advantageously composed of two springs with constant, but different, respective flexibilities which are disposed in series. The system 31b, which surrounds the system 31a, bears against a shouldered ring 50, the section of which, in the plane of the drawing, has the form of an L (as can be seen in FIG. 3) the concavity of which faces both the slide valve 24 and the axis of the slide valve. This ring 50 is able to bear against the cup 32 (position shown in FIG. 3), in which case one arm of the L projects over that face of the cup 32 which is directed towards the slide valve 24. The system 31b is preferably composed of three springs in series and its law of flexibility is represented by the line with breaks 51 (chain dotted in FIG. 5) approaching a curve 51a obtained by the difference in the curves 47 and 48.

Said means, or the suspension selector, 46 advantageously comprise a piston of revolution 52, the meridian section of which has the form of an L with its concavity remote from that of the ring 50. The piston 52, which is located between the cup 32 and the plug 36, slides in a bore 53 coaxial with the slide valve 24 and formed in the cylinder head 12. A plug 54 screwed into the outer end of the bore 53 has a ring 55 which comes into contact at its inside surface with the periphery of the small diameter cylindrical portion 52a of the piston 52, so as to define a space or chamber of revolution 56 the meridian section of which is substantially a rectangle, as can be seen in FIG. 3. The ring 55 is located between the piston 52 and the cup 32. A disc 57 coaxial with the rod 34 is provided between the ring 55 and the cup 32, the dimensions of the disc 57 being such that it can cooperate with the portion 52a of the piston 52 and the ring 50.

The suspension selector 46 also comprises two concentric springs 58 and 59 calibrated as explained hereinafter and disposed in parallel between the piston 52 and the plug 36. The inner spring 58 acts directly on the piston 52. The outer spring 59 acts on said piston through the medium of an abutment ring 60. A spring stop ring 61 anchored in the bore 53 is provided between the piston 52 and the abutment ring 60. This spring ring 61 serves as a stop on the one hand for the piston 52 when it approaches the plug 36 and, on the other hand, for the ring 60 when this ring, urged by the spring 59, is shifted towards the plug 54. A device (not shown) is provided for admitting the fluid underpressure to the chamber 56 or removing the same therefrom. The pressure of the fluid admitted into the chamber 56 controls the suspension selector 46 and will be referred to as the "pilot pressure."

A suspension of this kind operates in the following manner.

In the cross-country position of the suspension selector, the pilot pressure of the fluid in the chamber 56 is sufficient to repel the piston 52 to the left to the maximum extent until it abuts the spring ring 61; the systems 31a and 31b therefore act on the slide valve 24. The "cross-country" suspension law, represented by the curve 47 (FIG. 5), is equal to the sum of the laws corresponding to each of the systems 31a and 31b. The slide valve 24 operates as hereinbefore described.

In the "road" position of the suspension selector, the pilot pressure is just sufficient to compress the spring 58 and bring the piston 52 into contact with the ring 60, but is insufficient to oppose the action of the spring 59 which, within the limits fixed by the spring ring 61 for the displacement of the ring 60 towards the right, exerts on the ring 50, through the medium of the ring 60, the piston 52 and the disc 57, a force which displaces the ring 50 towards the right and compresses the system 31b, the maximum effort of which is lower than the force of the spring 59, and this eliminates the action of the system 31b on the cup 32, from which the ring 50 has moved away, and allows only the action of the system 31a, which has remained in contact with the cup 32, to be exerted on the slide valve 24. The "road" suspension law, represented by the curve 48, is thus determined by the system 31a alone.

The two laws are distinguished by the fact that the volume of liquid contained in the cylinder 9 and the accumulators 20 and 21 is different for each law (greater for the law represented by the curve 47). This volume, however, remains constantly equal, in each case, to the value chosen, as explained hereinbefore. Passage from the curve 48 to the curve 47 takes place by a translation T parallel to the X-axis and with an amplitude equal to the quotient of the difference in the said volumes of liquid divided by the section S of the piston 8.

It is clear that a number of suspension laws greater than two could easily be provided.

Figure 4:
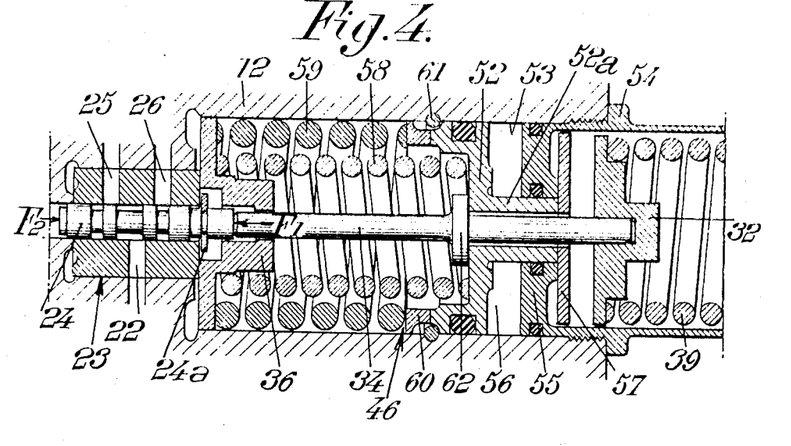

The constructional form of FIG. 3 can readily be adapted to the case of a single system of springs, as shown in FIG. 4.

A "raising" position of the suspension selector may be provided with advantage for the two-constructional forms shown in FIGS. 3 and 4.

In this "raising" position, the chamber 56 is connected to the outlet and the pilot pressure is nil. The spring 58, the force of which is greater than the sum of the forces of the springs 31a and 31b, pushes the large diameter portion of the piston 52 against the ring 55 and moves the cup 32 away from the rod 34 through the medium of the disc 57. The force $F_1$ exerted on the slide valve 24 is nullified and the force $F_2$ places the slide valve in the position in which the passage 22 is connected to the outlet. The suspension gives way.

Figure 7:
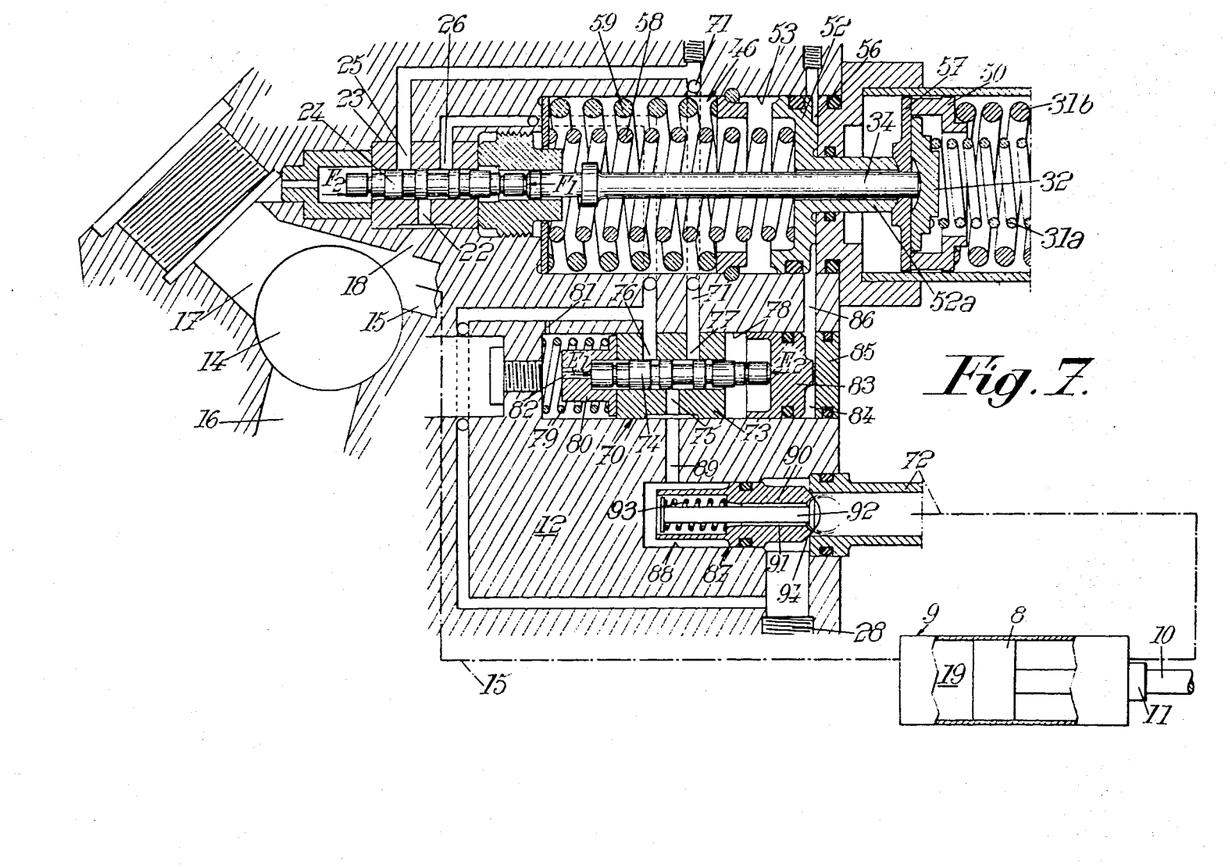
FIG. 7, finally, is a diagrammatic view of a part of a suspension similar to that of FIG. 3 and of the admission device thereof.

Advantageously, a device which is not shown in FIG. 3, but will be described with reference to FIG. 7, is provided for admitting a fluid under pressure at this moment against that face of the piston 8 which is on the side where the rod 10 is located and this brings the wheel 4 nearer to the frame and enables it to be taken off the ground when the other wheels of the vehicle occupy a normal position with respect to the frame. In this way, a wheel or tire can easily be changed.

It is also possible, when moving or at a standstill, to cause only certain wheels to bear on the ground.

It is also possible to provide the rod 34 with a shoulder 62 (FIG. 4) located between the piston 52 and the plug 36 and adapted to cooperate with said piston 52 when it is at the end of its stoke towards the left. In this case, when the suspension selector occupies a so-called "high position," the piston 52 is repelled to the maximum extent towards the left by the fluid under pressure in the chamber 56 and, in cooperating with the shoulder 62, said piston displaces the slide valve 24 towards the left and liquid under pressure is admitted into the chamber 19 as long as the piston 52 remains in its extreme left-hand position. When this operation is effected for all the wheels, the vehicle then adopts a high position to which there corresponds a maximum ground clearance which enables an obstacle of a height greater than the normal ground clearance to be cleared.

For the functioning of the resupply of the cylinder 9 with liquid, to be ensured under all circumstances, it is sufficient that the pressure delivered by the source 27 be at least equal to the pressure $P_o$ necessary for supporting the maximum static load which the wheel may have to support. If, in actual fact, the pressure delivered by the source is equal to $P_o$, it is necessary, when the pressure in the cylinder 9 exceeds $P_o$ in consequence of dynamic stresses, to prevent any return of fluid towards the source 27. This is the function of the nonreturn valve 38. By reason of the presence of this valve, for pressures greater than $P_o$, it is immaterial whether the passage 25 is in communication with the passage 22 (FIG. 1) or not, and, beyond the pressure $P_o$, the flexibility curve of the system of springs 31 is no longer compelled to follow the curve of the hydropneumatic suspension as closely as possible. It is merely necessary that the force of the system 31 be such that, beyond the pressure $P_o$, the passages 22 and 26 are not placed in communication, that is to say the cylinder 9 is not connected to the outlet.

Figure 6:
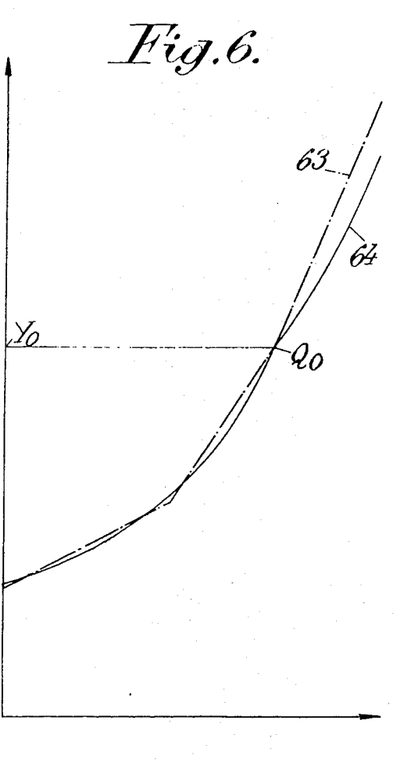

For this purpose, it is sufficient for the flexibility curve 63 (FIG. 6) of the springs of the constructional form of FIG. 4 to be situated, starting from the point $Q_o$ corresponding to the pressure $P_o$ in the suspension, above the curve 64 of the hydropneumatic suspension, which enables the system of springs to be simplified. The curves 63 and 64 of FIG. 6, which relate to the constructional form of FIG. 4, are respectively quite similar to the curves 42 and 29 of FIG. 2, which relate to the constructional form of FIG. 1. The coordinates system, in particular, has been preserved.

By way of numerical example, the following values are given:

| | | |
|---|---|---|
| Maximum static pressure | $P_o=1.5\times10_7$ Pa | or 150 bars |
| section of the piston 8 | $S=5\times10^{13}$ m.$^2$ | or 50 cm.$^2$ |
| force on the piston 8 corresponding to a pressure $P_o$ | $Y_o=7.5\times10^4$N | or 7,500 daN |
| section of the slide valve 24 | $s=3\times10^{15}$ m.$^2$ | or 0.3 cm.$^2$ |

Referring now to FIG. 7, there can be recognized the constructional form of FIG. 3 completed by an admission device 70 provided for directing a liquid under pressure on to the nonoperative face of the piston 8, which is remote from the chamber 19. The admission device has been mentioned previously without being described in detail.

This device preferably enables communication to be established between a channel 71 connected to the source of liquid under pressure and a pipe 72 opening into the cylinder 9 in the direction of the nonoperative face of the piston 8. The device 70 is arranged in such manner that communication between the channel 71 and the pipe 72 is established only when the force $F_1$ is nullified.

The admission device 70 is advantageously controlled by the aforesaid pilot pressure of the fluid admitted into the chamber 56, in such manner that when this pilot pressure assumes the value, generally chosen as zero, which nullifies the elastic return force $F_1$ the admission device 70 directs liquid underpressure on to the face of the piston 8 remote from the operative face.

The admission device is preferably constituted by a distributor 73 which includes a control slide valve 74 on which two opposing forces are exerted, on the one hand an elastic return force $E_1$ and, on the other hand, a force $E_2$ proportional to the pilot pressure of the fluid.

The distributor has three passages 75, 76, 77 connected respectively, directly or indirectly, to the pipe 72, the outlet 28 and the high-pressure liquid channel 71, Inside the distributor, the slide valve 74 can either isolate the passage 76 from the other two passages 75 and 77 and allow the latter to intercommunicate (position shown in FIG. 7), or isolate the passage 77 and allow the passage 75 to communicate with the passage 76.

The distributor 73 is housed in a bore 78 provided in the cylinder head 12. A coil spring 79 compressed between a wall defining said bore 78 axially and a cylindrical cap 80 covering one end of the slide valve 74 exerts on said slide valve 74 the force $E_1$ tending to displace the slide valve towards the position in which the passages 75 and 77 communicate. The space in which the spring 79 and the cap 80 are housed is connected to the outlet by a duct 81 which ensures the evacuation of any leakages of liquid under pressure and prevents a rise in pressure in said space. Likewise, a duct 82 drilled in the cap 80 prevents the accumulation of leakages of liquid under pressure between the slide valve 74 and the cap.

That end of the slide valve 74 which is remote from the cap 80 bears against a piston 83 sliding in a fluidtight manner in the bore 78. That face of the piston 83 which is remote from the slide valve 74 constitutes a movable wall of a chamber 84 which is moreover defined by the bore 78 and a cylindrical end plug 85. The chamber 84 is connected to the chamber 56 by a channel 86.

The passage 75 of the distributor 73 is preferably connected to the pipe 72 through the medium of a valve 87 controlled by the aforesaid distributor 73. The valve 87 is housed in a blind bore 88 provided in the cylinder head 12. The far end of the bore 88 is connected to the passage 75 of the distributor 73 by a channel 89. The end portion of the bore 88 distant from the channel is connected axially to the pipe 72 and radially to the outlet 28. The valve 87 includes a member of revolution 90 sliding in a fluidtight manner in the bore 88, the seal achieved separating the far end of said bore, into which the channel 89 opens, from the portion in which the lateral opening providing connection with the outlet 28 is formed. The member 90, the substantially cylindrical form of which is apparent in the drawing, has an axial duct 91 in which a poppet valve 92 can move, the stem of said valve having a diameter smaller than that of the duct 91. A coil spring 93 is disposed between the member 90 and one end of the stem of the poppet valve 92 in such manner that said spring 93 tends to apply the head of the poppet valve 92 against the end of the duct 91 opening towards the pipe 72 and thus close this duct. The member 90 terminates towards the inlet of the pipe 72 in a frustoconical surface 94 designed to cooperate with a seat provided at the end of the pipe 72. When the pressure upstream of the valve 87, that is to say the pressure in the channel 89, is higher than the pressure in the pipe 72, the member 90 is pushed against the inlet of the pipe 72, which pipe is thus isolated from the outlet 28. Under the effect of the difference in pressure, the spring 93 is compressed and the head of the poppet valve 92 is disengaged from the end of the member 90 and allows a throttled flow of the liquid towards the pipe 72. When the channel 89 is connected to the outlet by the slide valve 74, the member 90 is no longer applied against the inlet of the pipe 72, which is thereby connected to the outlet 28.

The admission device operates in the following manner.

When the pilot fluid pressure is zero (case of FIG. 7), the chambers 56 and 84 are simultaneously at zero pressure. Since the piston 83 is subjected to a zero fluid pressure, it exerts a zero force $E_2$ on the slide valve 74. Under the effect of the spring 79, the slide valve 74 pushes the piston 83 against the plug 85 and the channel 89 is connected to the channel 71 and to the source of liquid under high pressure. Because of this, the valve 87 isolates the pipe 72 from the outlet 28 and connects the channel 89 to the pipe 72. Moreover we know that when the pressure is zero in the chamber 56 the chamber 19 is connected to the outlet. Since liquid under high pressure is admitted through the pipe 72, the piston 8 will force the liquid from the chamber 19 towards the outlet and the wheel of the vehicle connected to the rod 10 will rise and move nearer to the frame.

When the pilot pressure in the chamber 56 and, therefore, in the chamber 84 has a value sufficient to push the piston 52 in opposition to the action of the spring 58 at least, the force $F_1$ exerted by the systems of springs 31a, 31b on the rod 34 is not zero.

The spring 79 and the piston 83 are calculated in such manner that this pilot pressure is sufficient for the force $E_2$ of the piston 83 on the slide valve 74 to be greater than the force $E_1$ of the spring 79 on said slide valve. This valve will therefore shift as far as the position in which the passage 75 and the channel 89 are connected to the outlet by the passage 76. Since the pressure in the channel 89 is nullified, as hereinbefore explained, the member 90 of the valve 87 moves away from the inlet of the pipe 72 and establishes communication between this pipe and the outlet. The piston 8 will be able to move and force liquid through the pipe 72.

A suspension of this kind finds an interesting application in heavy vehicles with a plurality of sets of wheels, four for example.

In effect, it is possible to provide a suspension for each set of wheels and different combinations of pilot pressures for each set, these pressures being adapted in the best manner possible to the work demanded of the vehicle.

In the case of a vehicle having four sets of wheels, two end sets and two intermediate sets, the following solution may be considered.

The two end sets will have a suspension with a double system of springs 31a, 31b and corresponding to the constructional forms of FIGS. 3 and 7, with which suspension it is possible to obtain, at choice, two different flexibilities or bring the wheel up to the frame to the maximum extent (zero pilot pressure). The two intermediate sets will have a suspension with a single system of springs and corresponding to the constructional form of FIG. 4, with which it is possible either to bring the wheel up to the frame to the maximum extent (zero pilot pressure), or obtain a suspension of given flexibility (medium pilot pressure), or move the wh---¹ frame to the maximum extent (maximum p The vehicle being at a standstill, it is advantageous to be able to obtain a position of the body or frame with respect to the ground which is the lowest possible. For this purpose, it is necessary that the wheels be raised to the maximum extent with respect to the frame. The pilot fluid pressure for each suspension must therefore be zero.

When the vehicle is travelling on a road, it is desirable that an intermediate set of wheels be raised and that the other three sets of wheels have a suspension the characteristics of which correspond to a certain suspension law. The pilot pressure of the intermediate set which is raised must therefore be zero and the pilot pressures of the other sets must be equal to their medium value.

For movement of the vehicle across country, it is expedient that the two extremes sets of wheels have a harder suspension than on the road, which will be obtained by applying the maximum pilot pressure to them, and that the two intermediate sets of wheels have a flexibility corresponding to the medium pilot pressure.

Finally, for a vehicle in which all the wheels are driving wheels, there may be desired a position of the wheels in which the turning circle is minimal and permits turning on the spot. For this purpose, the two end sets of wheels will be raised (zero pilot pressure) and the two intermediate sets will be lowered to the maximum extent by giving the maximum value to the pilot pressure.

The table hereunder gives for these various uses the pilot pressures to be applied to each of the sets in order to achieve the suspension combinations adapted to the demands imposed on the vehicles.

|  | End sets of wheels | First intermediate set of wheels | Sencon intermediate set of wheels |
|---|---|---|---|
| Low position | Pilot pressure: zero | Pilot pressure: zero | Pilot pressure: zero. |
| Travelling on roads | Pilot pressure: medium value | Pilot pressure: zero value | Pilot pressure: medium value. |
| Travelling across country | Pilot pressure: maximum value | Pilot pressure: medium value | Pilot pressure: medium value. |
| Turning on the spot | Pilot pressure: zero | Pilot pressure: maximum value | Pilot pressure: maximum value. |

A simple way of obtaining the pilot pressures is to reduce the pressure of the liquid of the source by means of adjustable expansion valves.

For example, the adjustment of the expansion valves may be effected by means of cams mounted on the same shaft which is controlled by a four-position handwheel, the four positions corresponding to the four combinations required: low position, travelling on roads travelling across country, turning on the spot.

There will be three expansion valves, one for the two end sets of wheels and one for each intermediate set of wheels and, in each position of the control handwheel, the adjustments of the expansion valves will provide one of the combinations given in the table.

As a result of the foregoing, a suspension is obtained which fully meets the aim which it has been proposed to achieve that is to say a suspension which adds to the conventional advantages of hydropneumatic suspensions, such as low weight and small overall dimensions, the possibility of changing height, an advantageous law of flexibility and incorporation of the shock-absorbing device, the advantage of establishing a biunivocal correspondence between the positions of the wheel with respect to the frame and the loads supported by the wheel.

This result is obtained in a simple, economic and rapid manner as a result, in particular, of the use of combinations of coil springs of constant individual flexibility grouped in series or in parallel, which combinations enable an equivalent spring of variable flexibility to be obtained at low cost, whereas a single spring of variable flexibility would be costly and difficult to make.

As is obvious and is moreover already apparent from the forego--- tions thereof, in particular those in which the slide valve 24 would be rotary.

What I claim is:

1. A hydropneumatic vehicle-wheel suspension system comprising connecting means between at least one wheel and the chassis of the vehicle adapted to permit substantially vertical movement of said wheel, a piston and cylinder assembly whose piston is adapted to move in the cylinder in response to the vertical movement of said wheel, at least one oleopneumatic accumulator into which the piston displaces liquid contained in a chamber of the cylinder, through an active surface, on upward movement of said wheel, a source of liquid under pressure and a distributor valve adapted to selectively connect said cylinder to said source or to an outlet, spring means of which one end is supported against one end of said distributor valve and whose elongation is proportional to the displacement of the piston and passage means adapted to direct to the other end of the distributor valve liquid under pressure from the chamber of the cylinder, the characteristics of the spring means being such that the spring or first force exerted by the spring means on the distributor valve, according to the elongation of the spring means, is equal for at least a part of the stroke of the piston, to the liquid or second force which would be developed on the distributor valve by the liquid, if the volume of the liquid remained constant, the assembly being such that the distributor admits supplementary liquid into the cylinder when said second force becomes less than said first force.

2. The system set forth in claim 1 in which said spring means has two alternative spring rates and selector means are provided to select the desired spring rate.

3. The system set forth in claim 1 and including overriding means for moving said valve member to a position in which the chamber of said cylinder is continuously connected to said source of liquid under pressure when the position of maximum height of said suspension is required.

4. The system of claim 2 including means for selectively removing said first force from said valve member whereby to collapse said wheel suspension.

5. The system set forth in claim 4 in which a second chamber is provided in said cylinder on the opposite side of said piston to said first chamber and means are provided for admitting fluid pressure to raise said wheel as said suspension is collapsed.

6. The system as set forth in claim 5 in which said means for admitting liquid to said second chamber are supplied with liquid from said source of liquid under pressure and are controlled by control means which also act to remove said first force.

7. The system set forth in claim 6 in which said control means comprise a second distributor having a movable valve member against which a control pressure is applied against the action of a resilient return force.

8. The system set forth in claim 7 in which a further valve is controlled by said second distributor and interposed between said two distributors and said second chamber of said cylinder, said further valve serving to isolate said second chamber from said outlet when said second distributor admits liquid under pressure to said further valve and to place said second chamber in communication with said outlet when said second distributor places said further valve in communication with said outlet.

9. The system set forth in claim 1 in which said distributor valve is a slide valve and said spring means comprises a system of springs of constant but different flexibilities, said springs being disposed in series.

10. The system set forth in claim 9 in which said piston has a piston rod having a lateral projection serving as abutment for one end of said series of springs.

11. The system set forth in claim 2 in which said resilient means comprises two sets of springs, said spring sets being coaxial and disposed in parallel.

12. The system set forth in claim 4, in which control means for adjusting the flexibility of said suspension comprise a supplementary piston slidably mounted in a further chamber and adapted to inactivate a spring of said spring means when said further chamber is subjected to fluid under a control pressure.

13. The system set forth in claim 1 and including at least two oleopneumatic accumulators having different precharge pressures whereby two act in cascade.

14. The system of claim 6 in a vehicle having a plurality of sets of wheels in which each set of wheels have a hydropneumatic suspension in accordance with claim 6.

15. The system set forth in claim 14 in which the control pressures for controlling the operation of each suspension system is derived from a single control source through the intermediary of pressure-reducing control valves controlled by cams on a single control shaft.

16. The system of claim 3 including means for selectively removing said first force from said valve member whereby to collapse said wheel suspension.

* * * * *